(12) United States Patent
Steiss

(10) Patent No.: US 6,571,363 B1
(45) Date of Patent: May 27, 2003

(54) SINGLE EVENT UPSET TOLERANT MICROPROCESSOR ARCHITECTURE

(75) Inventor: Donald E. Steiss, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/464,635

(22) Filed: Dec. 15, 1999

Related U.S. Application Data
(60) Provisional application No. 60/114,368, filed on Dec. 30, 1998.

(51) Int. Cl.⁷ ................................................ G06F 11/27
(52) U.S. Cl. ....................... 714/732; 714/726; 714/733; 714/736; 712/227
(58) Field of Search .......................... 712/227; 714/726, 714/732, 733, 736

(56) References Cited

U.S. PATENT DOCUMENTS

| | | | | |
|---|---|---|---|---|
| 4,929,889 A | * | 5/1990 | Seiler et al. ................. | 714/731 |
| 5,269,017 A | * | 12/1993 | Hayden et al. ............... | 714/15 |
| 5,293,613 A | * | 3/1994 | Hayden et al. ............... | 714/15 |
| 5,388,253 A | * | 2/1995 | Geneste et al. ............... | 714/38 |
| 5,469,445 A | * | 11/1995 | Nicolaidis .................... | 714/726 |
| 5,659,721 A | * | 8/1997 | Shen et al. ................... | 712/228 |
| 5,793,941 A | * | 8/1998 | Pencis et al. .................... | 714/5 |
| 5,974,529 A | * | 10/1999 | Zumkehr et al. ............. | 712/41 |
| 5,978,936 A | * | 11/1999 | Chandra et al. .............. | 714/43 |
| 6,357,024 B1 | * | 3/2002 | Dutton et al. ................. | 714/45 |

FOREIGN PATENT DOCUMENTS

EP     0 411 904 A2   *   7/1990

OTHER PUBLICATIONS

Avra et al., "Synthesizing for Scan Dependence in Built–In Self–Testable Designs," Proceedings of the International Test Conference, IEEE, Oct. 17–21, 1993, pp. 734–743.*

Wilken et al., "Continuous Signature Monitoring: Efficient Concurrent–Detection of Processor Control Errors," Proceedings of th International Test Conference, 'New Frontiers in Testing,' IEEE, Sep. 12–14, 1998, pp. 914–925.*

Tamir et al. "The Implementation and Application of Micro Rollback in Fault–Tolerant VLSI Systems," Eighteenth International Symposium on Fault–Tolerant Computing, Digest of Papers, IEEE, Jun. 27–30, 1988, pp. 234–239.*

Sosnowski, "Detection of Control Flow Errors Using Signature and Checking Instructions," Proceedings of the International Tes Conference, 'New Frontiers in Testing,' IEEE, Sep. 12–14, 1988, pp. 81–88.*

(List continued on next page.)

*Primary Examiner*—William M. Treat
(74) *Attorney, Agent, or Firm*—Robert D. Marshall, Jr.; W. James Brady, III; Frederick J. Telecky, Jr.

(57) ABSTRACT

A single-event-upset, fault-tolerant data processor architecture enables error detection and correction according to algorithms given. A hardware intensive solution compares signatures of two passes through a block of instructions. A match of signatures generated from the two passes through the block of instructions indicates valid operations, a mismatch indicates an error. A software assisted solution compares a signature generated from one pass through a block of instructions with a signature pre-calculated by a compiler or with a one of a set of pre-calculated signature selected at run time. This is useful for digital signal processor design using deep-sub-micron devices and dynamic logic for superior system performance by enabling detection of errors that can result from the low noise-immunity in circuits using higher impedance smaller devices with low threshold voltage and dynamic logic.

10 Claims, 5 Drawing Sheets

OTHER PUBLICATIONS

Tamir et al., "High–Performance Fault–Tolerant VLSI Systems using Micro Rollback," IEEE Transactions on Computers, vol. 39 Apr. 1990, pp. 548–554.*

Wilken, "Optimal Signature Placement for Processor–Error Detection Using Signature Monitoring," Twenty–First International Symposium on Fault–Tolerant Computing, Digest of Papers, IEEE, Jun. 25–27, 1991, pp. 326–333.*

Wilken et al., "Efficient Memory Access Checking," Twenty–Third International Symposium on Fault–Tolerant Computing, Diges of Papers, IEEE, Jun. 22–24, 1993, pp. 566–575.*

Bonet, "Testability Features of a 32 kbps ADPCM Transcoder," Proceedings of the International Test Conference, 'New Frontiers in Testing,' IEEE, Sep. 12–14, 1988, pp. 161–171.*

Kameda, Tiko, et al.; *Notes on Multiple Input Signature Analysis*, IEEE Transactions on Computers, vol. 42, No. 2, Feb., 1993, pp. 228–234.

Rajski, Janusz, et al.;*Accumulator–Based Compaction of Test Responses*, IEEE Transactions on Computers, vol. 42, No. 6, Jun., 1993, pp. 643–650.

Robinson, John P., et al.;*A Unified View of Test Compression Methods*, IEEE Transactions on Computer, vol. C–36, No. 1, Jan., 1987, pp. 94–99.

Larsson, Patrik, et al.;*Noise in Digital Dynamic CMOS Circuits*, IEEE Journal of Solid–State Circuits, Col. 29, No. 6, Jun. 1994, pp. 655–662.

Lee, Mankoo, et al.;*A Dynamic Logic Noise Susceptibility Induced by Interconnect Crosstalks and Alpha–Particle Upsets*, Digital Compression Products, Texas Instruments Incorporated, Dallas, Texas, USA, 4 papes.

* cited by examiner

SINGLE EVENT UPSET TOLERANT MICROPROCESSOR ARCHITECTURE

This application claims priority under 35 USC §119(e)(1) of Provisional Application No. 60/114,368, filed Dec. 30, 1998.

TECHNICAL FIELD OF THE INVENTION

The technical field of this invention is fault tolerant computing and more particularly microprocessors or digital signal processors that enable single event upset fault tolerance.

BACKGROUND OF THE INVENTION

Digital signal processor designs have improved steadily over the years, such that, ever increasing compute power (complexity) and improved clock rate performance have become the confident expectations of the user. This impressive evolution of capability has been made possible through the constant improvements in the producing of high density silicon devices which have, in turn, been made possible because of steady reductions in feature size of CMOS devices.

Processes are in place which are capable of producing deep-sub-micron devices. Deep-sub-mircon devices have feature sizes of less than two tenths of a micron. Using such devices of such high complexity on a single chip has necessitated the use of lower voltage power supplies. This is required both to reduce device power and to allow the devices to operate within the lower voltage stress limits of the smaller device sizes.

Deep-sub-micron devices have very low voltage threshold ($V_T$) as well. This characteristic has made designing with deep-sub-micron devices a formidable new challenge. Lower threshold voltage translates to lower noise-immunity. With an enormous number of devices switching (changing states) simultaneously, high levels of ground and power supply noise are generated. The use of dynamic logic to improve performance and circuit size and the need to make speed critical circuit components as small as possible brings new concerns for noise-immunity and vulnerability to logic-state faults. These faults must be dealt with in a sound manner if system reliability is to be achieved.

In addition, other well-known noise sources become more significant at the deep-sub-micron level. These noise sources include: higher levels of cross-talk between adjacent signal metallization; charges generated at dynamic nodes by Alpha particles; electromagnetic radiation from external sources; and substrate noise injection.

While many new circuit techniques have been brought to bear on the problem, the fact remains that dynamic logic using deep-sub-micron devices will simply be subject to growing reliability concerns. Thus there is a need in the art to address the aggravated noise problems associated with the use of low supply voltages and extremely small devices (sub-micron devices) and dynamic logic. Using these techniques result in devices of higher circuit impedances that are more easily perturbed, particularly in a dynamic logic environment, by power supply noise, by charges generated by Alpha particles, by electromagnetic radiation and by substrate noise, as noted above.

SUMMARY OF THE INVENTION

In the absence of creative new techniques, designers have frequently conceded the performance advantages of the smallest possible devices and have designed using larger device sizes to achieve the needed lower impedance and higher drive strength to make circuits more robust in these higher noise environments. This invention brings novel and unique techniques to bear on the problem. Chiefly these are hardware and software innovations which allow use of aggressive circuit design practices to reduce product cost, yet provide major new improvements in digital signal processor reliability through the use of fault tolerant architecture, and error detection and correction algorithms.

Dynamic faults have long been the concerns of computer designers. Many applications for computers require such high reliability that must be detected and corrected without any final errors resulting even for infrequent noise generated faults. These applications are chiefly the ones where human life or enormous financial investment must be protected. Fault-tolerant computers have emerged to serve such applications. Fault-tolerant design is receiving ever-increasing attention and concern.

Fault-tolerant systems often involve basic changes in the hardware design, and even more often, utilize software which directs the machine to do redundant as well as mainstream calculations. The results of the mainstream and the redundant calculations are compared to detect and correct errors by re-initiating the offending calculations. Fault-tolerant design typically involves generation of "signatures" or results, the processor state, and storing of "checkpoints". These checkpoints are the state of the machine at which the signature in question was generated. Error-detection-and-correction (EDAC) generally follows. Fault-tolerant design approaches often involve hardware and software techniques. These hardware techniques often incorporate in extremely high-complexity devices to provide for effective testing using a minimized test vector set to screen the highest number of possible fault occurrences. This is called test-compaction.

This invention uses a unique digital signal processor architecture, and further combines hardware and software in two separate approaches. These are: a hardware intensive solution technique with moderate use of software; and a software assisted solution which uses additional algorithm power to simplify the required hardware.

It is the further object of this invention to bring to bear a unique new principle, that is, redundancy-in-time. This contrasts to the prior art redundancy-in-hardware or redundancy-in-software. The invention allows for free use of aggressive circuit design techniques, such as employing the smallest possible device sizes and dynamic logic, but provides protection from the single-event-upset faults which can occur in such low noise immunity circuits. In the absence of the fault-tolerant EDAC techniques described in this invention, the reduced drive capability and resulting low noise immunity of these circuit techniques would render their use impractical because of the variety of noise sources which could otherwise cause unrecoverable errors.

BRIEF DESCRIPTION OF THE DRAWINGS

These and other aspects of this invention are illustrated in the drawings, in which.

DETAILED DESCRIPTION OF PREFERRED EMBODIMENTS

The problem solved by this invention is often labeled fault-tolerance to single-event-upset (SEU) because of the nature of the fault. Machines may be extremely reliable, but a single noise pulse or other external disturbance can cause one error in many thousands of calculations, and thereby cause a major disaster. This invention is focused on providing a means for dealing with such disruptive SEU events. There are two aspects of this invention; a hardware intensive solution; and a software intensive solution.

DESCRIPTION OF HARDWARE INTENSIVE SOLUTION

Figure 1:
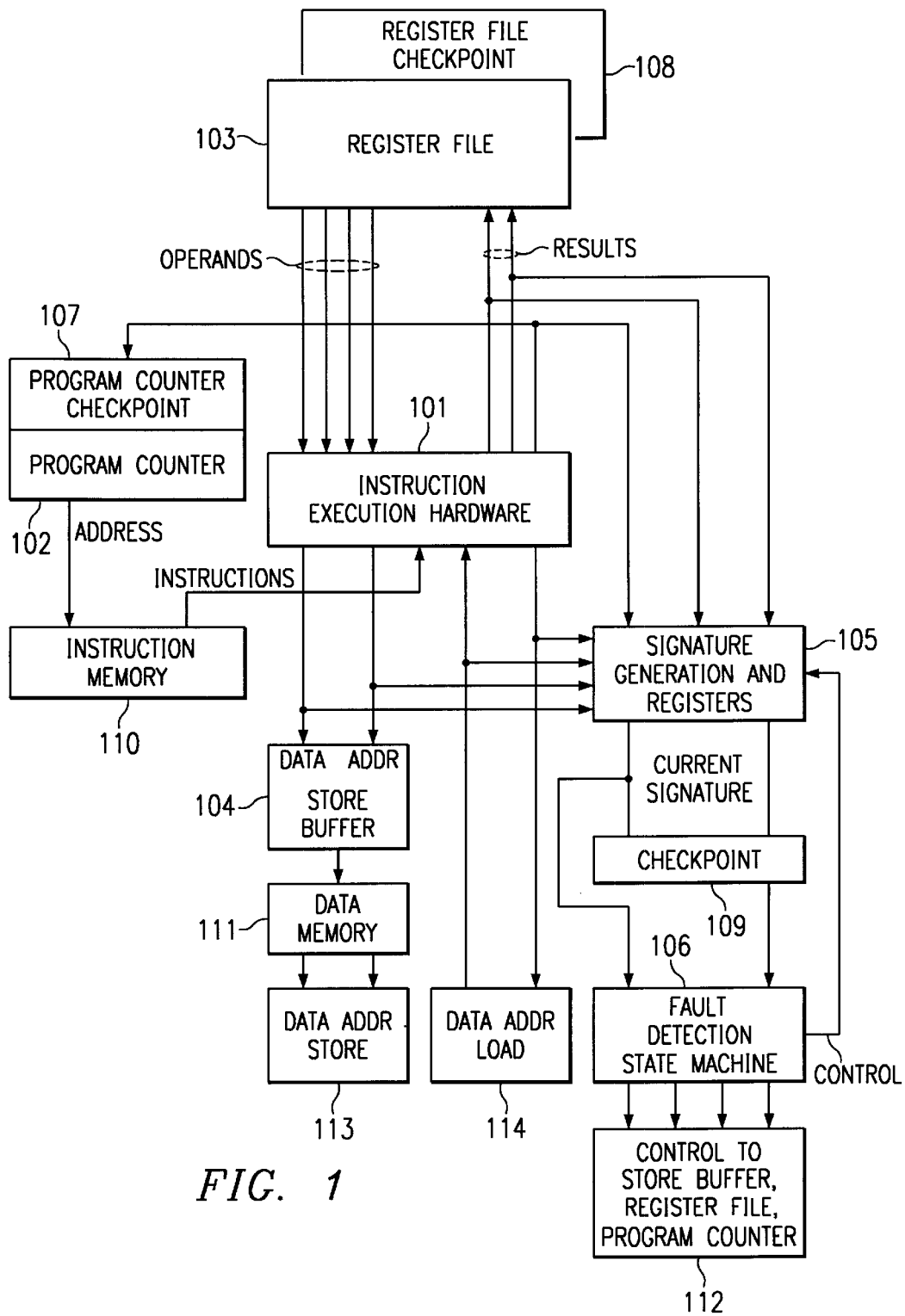
FIG. 1 illustrates in block diagram form the architecture of the single-event-upset fault tolerant digital signal processor of this invention.

FIG. 1 is block diagram illustrating a digital signal processor architecture for the hardware intensive solution of this invention. The architecture of FIG. 1 includes the hardware for this solution. The full solution provided by the invention requires additionally, software algorithms to implement either the hardware intensive solution, or the software-assisted solution, both of which exploit time-redundancy instead of simple hardware redundancy to achieve the desired results. As mentioned earlier, the difference between hardware-intensive and software-assisted solutions lie chiefly in the amount or complexity of the total hardware required.

FIG. 1 includes instruction execution hardware 101. Instruction execution hardware 101 is connected to program counter 102, register file 103, store buffer 104, signature generation logic and registers 105, and the fault detection state machine 106. Program counter 102, register file 103, and signature generation logic and registers 105 are paired with corresponding checkpoint registers 107, 108, and 109.

Register file 103 operates as a typical digital signal processor register file for the instruction execution hardware. In addition to this functionality, the register file includes a checkpoint array 108. Checkpoint array 108 includes what is sometimes called "shadow registers" that can hold a copy of the current state of the register file (creates a "checkpoint") and that can update the register file from a checkpointed state.

Program counter 102 operates as a typical program counter for instruction execution hardware 101. In addition, program counter 102 includes a checkpoint copy 107 of the current program counter state or can update the program counter from a checkpointed state.

Instruction execution hardware 101 execute instructions recalled from instruction memory 110 as addressed by program counter 102. Instructions are read and cause instruction execution hardware 101 to operate on the contents of the register file 103. Instructions can also cause instruction execution hardware 101 to generate store data memory addresses 113 and load data memory addresses 114. Pipelined, superscalar and/or very long instruction word instruction execution can be implemented.

Store buffer 104 holds data to be written to memory. It serves two purposes. First, store buffer 104 frees the processor from stalls due to write operations. Store buffer 104 also buffers information that may be used or discarded depending on the outcome of fault detection. It should be noted that store buffer 104 in this architecture has a limitation compared to store buffers in other architectures. Store buffer 104 cannot source data in the case of a load address matching an address of data within the store buffer 104. This limitation is rather easily dealt with, and is required to achieve the fault tolerance of this invention.

Signature generation logic and registers 105 takes in all results computed by the instruction execution hardware 101. These include all load data and addresses. Signature generation logic and registers 105 computes a signature by means known in the art. Signature generation logic and registers 105 maintains two versions of the signature, the current signature and a checkpointed copy stored in checkpoint registers 109. The checkpointed copy of the signature is never copied back to the current signature.

Fault detection state machine 106 controls the transfer of the machine state to the checkpoint registers 107, 108 and 109, controls the unloading of store buffer 104, and compares the current signature to the checkpointed signature. Pseudo-code for the fault detection machine 106 is given by way of the flow charts illustrated in FIGS. 2, 3 and 4.

Operation of the hardware intensive solution of this invention will now be described in detail with reference to FIGS. 2, 3 and 4. In state "0", the digital signal processor of FIG. 1 executes the instructions in a checkpointed block to form a signature to be used in the subsequent state to detect an error.

Figures 2, 3:
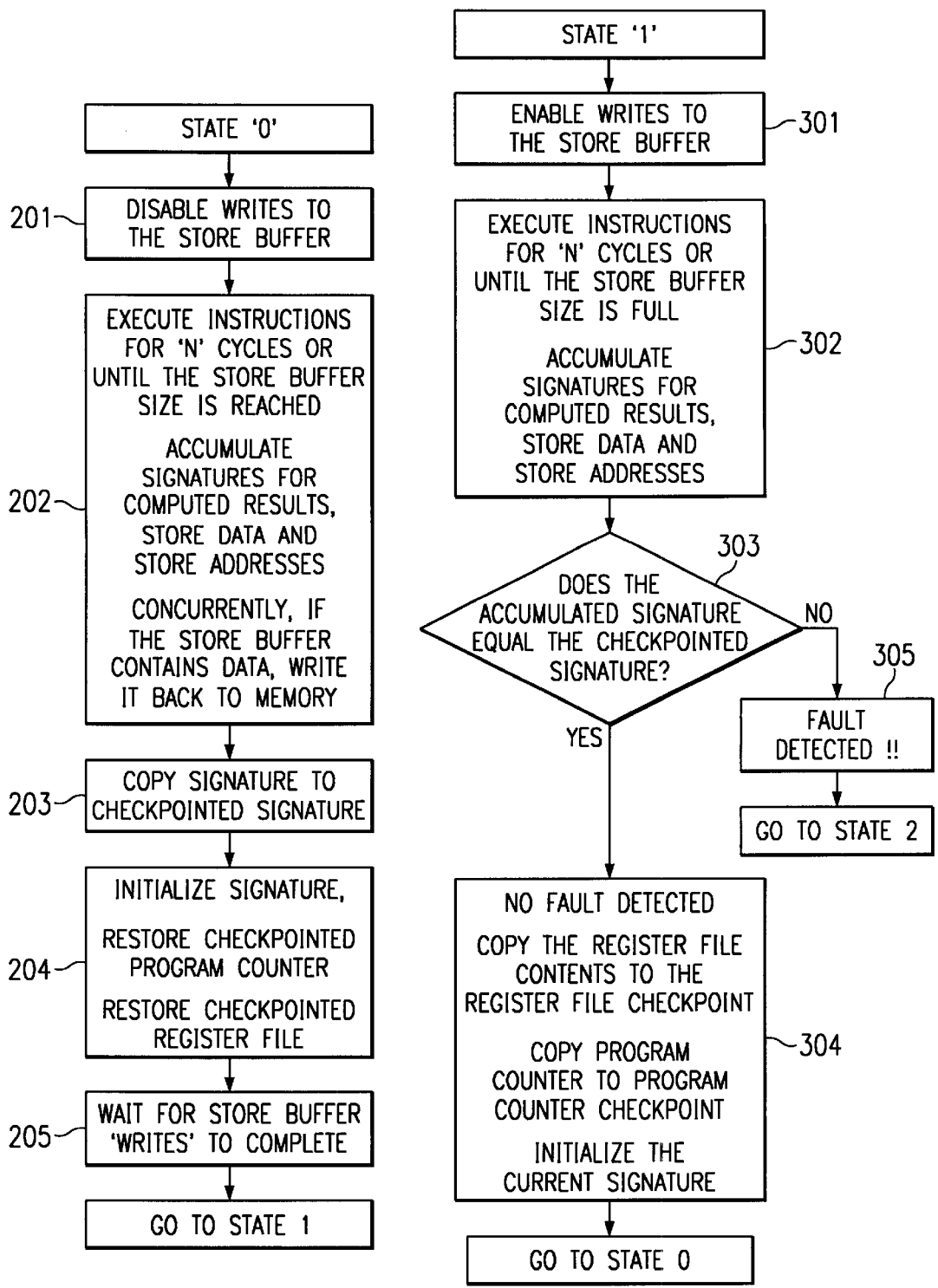
FIG. 2 illustrates in flow chart form the hardware intensive fault tolerant approach for state "0" through state "1" processes.
FIG. 3 illustrates in flow chart form the hardware intensive fault tolerant approach for state "1" through state "2" processes.

Referring to FIGS. 1 and 2, at the beginning of state "0" a controlling state machine, located in instruction execution hardware 101, first disables writes to store buffer 104 (processing block 201). Store buffer 104 may contain information from a prior checkpointed block. During state "0", write operations will be queued to store buffer 104. These operations do not undergo any processing beyond counting the number of such operations and storing the address and data in signature generation logic and registers 105.

At processing block 202 the checkpointed block is executed for the first time using instruction execution hardware 101 and register file 103. This instruction execution continues until one of two conditions is reached. The instruction execution stops: (a) if the number of clock cycles equals a predetermined constant "N"; or (b) if a counter in store buffer 104 indicates that the number of writes to store buffer 104 equals the buffer size. During this time a signature or multiple signatures are accumulated on computed results, store data and store addresses in the signature generation logic and registers 105. During this process of block 202, if any information is valid in store buffer 104, that information is written to memory concurrently with the execution of the instructions in the checkpointed block.

Upon completion of the checkpointed block on detection of one of the two conditions (a) or (b) above, the accumulated signature is copied to a checkpoint register 109 (processing block 203).

In processing block 204 the current signature is initialized, program counter 102 is restored from checkpoint register 107 and register file 103 is restored from register file checkpoint 108. Prior to transfer to state "1", processing block 205 completes any outstanding store operations from store buffer 104.

FIG. 3 illustrates the processes of state "1". In this state "1" the digital signal processor re-executes the checkpointed block and compares the results to determine if an error has occurred. At the beginning of state "1", processing block 301 enables writes to store buffer 104. Processing block 302 executes the checkpointed block for a second time. Note that the stop conditions of processing block 302 are the same as for processing block 202, the first execution of the checkpointed block. Thus the checkpointed block is re-executed. This instruction execution continues until one of two conditions is reached. The instruction execution stops: (a) if the number of clock cycles equals a predetermined constant "N"; or (b) if a counter in store buffer 104 indicates that the number of writes to store buffer 104 equals the buffer size. During this time a signature or multiple signatures are accumulated on computed results, store data and store addresses in the signature generation logic and registers 105.

Upon completion of the checkpointed block on the detection of one of the two conditions (a) or (b) above, the accumulated signature is compared to the checkpointed signature register 109 written earlier by processing block 203 (decision block 303). If the current signature matches the checkpointed signature (decision block 303), then no fault was detected. The process continues with processing block 304. The digital signal processor is initialized to go to state "0" by copying the contents of register file 103 to the register file checkpoint 108, copying program counter 102 to program counter checkpoint register 107, and initializing the current signature in signature generation logic and registers 105. Following these steps, the controlling state machine within instruction execution hardware 101 returns to state "0" illustrated in FIG. 2. If the current signature does not match the checkpointed signature (decision block 303), then a fault was detected (processing block 305). The controlling state machine in instructions execution hardware 101 transitions to state "2".

Figures 4, 5:
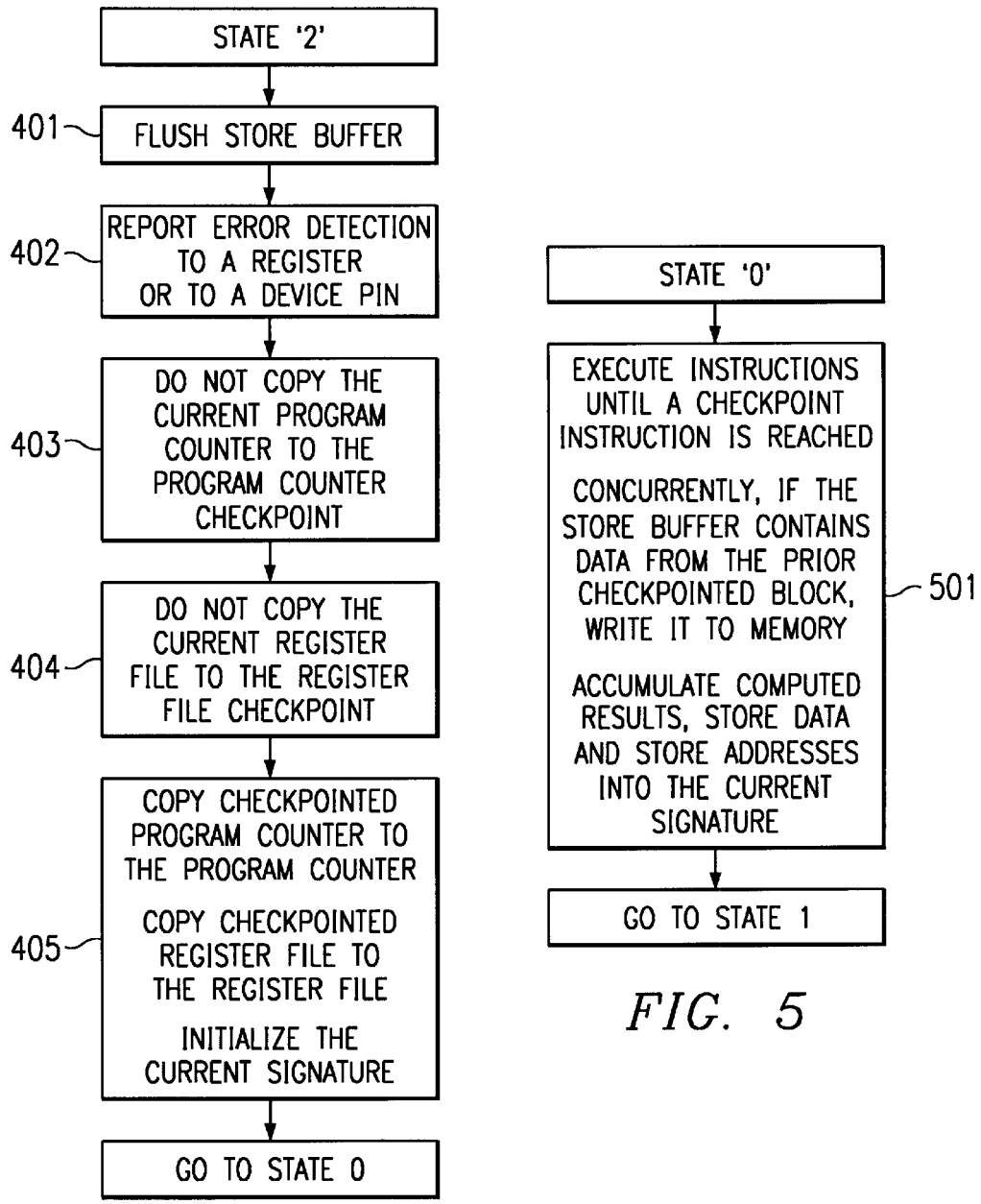
FIG. 4 illustrates in flow chart form the hardware intensive fault tolerant approach for state "2" through return to state "0" processes.
FIG. 5 illustrates in flow chart form the software assisted fault tolerant approach for state "0" through state "1" processes.

Referring now to FIG. 4, state "2" begins by flushing the store buffer 104 (processing block 401). This is done because a fault was detected, the store buffer contents are invalid. An externally visible report that a fault was detected is then produced (processing block 402). This report is extremely useful. It can be used to indicate an unstable system environment or a device approaching a hard failure. The state of the digital signal processor is initialized to re-enter state "0" without any information from the prior instruction execution from states "0" and "1". The current contents of program counter 102 is inhibited from being copied to the program counter checkpoint register 107 (processing block 403). The current contents of register file 103 is inhibited from being copied into register file checkpoint 108 (processing block 404). Next program counter 102 is restored from program counter checkpoint 107, checkpoint register file 108 is copied into register file 103 and the current signature in the signature generation logic and registers 105 is initialized (processing block 405). In this way, state "0" will start with the same initial conditions that it had on the last evaluation of state "0". The process then returns to state "0" to repeat the process.

The fault tolerant algorithm of the FIGS. 2, 3, and 4 operates as follows. Fault detection state machine 106 requires the same results as determined by the signature comparison on two passes through a checkpointed block of instructions before allowing the results of those instructions to be visible to the system. The contents of store buffer 104 from the prior execution period is unloaded during the first pass of the next execution period. This permits store buffer 104 to be single-ported simplifying the hardware and allows the store buffer 104 write time to be hidden. However, store data will be unavailable for subsequent loads until the end of the execution cycle of the next checkpointed block.

Figure 7:
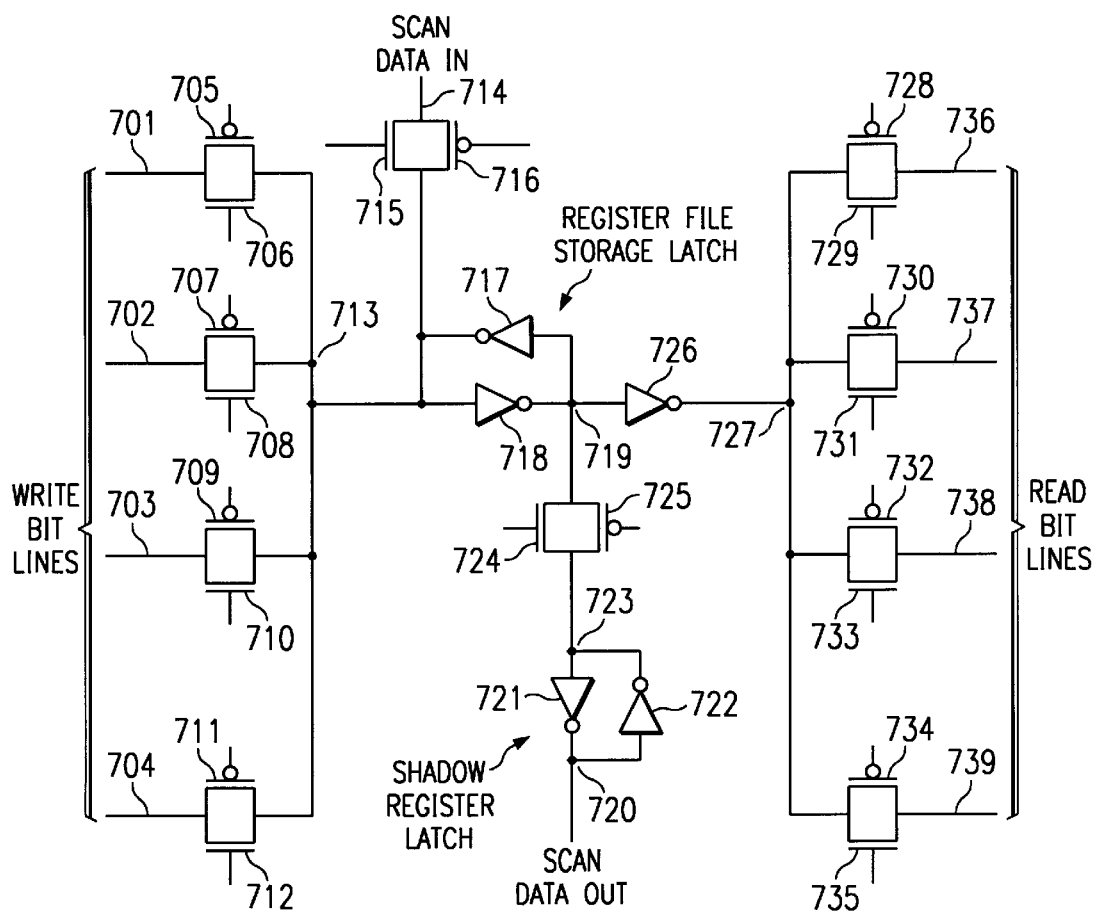
FIG. 7 illustrates in schematic diagram form the use of shadow registers on register file circuitry which have been used in prior art for testing purposes only, but which are used to perform a second task in this invention to store checkpoints to be used in recovery from a detected fault.

FIG. 7 illustrates a preferred construction of register file 103 and register file checkpoint 108. While the transistor count required to checkpoint the main register file 103 is significant, typical commercial digital signal processor designs have scannable register files. The additional memory elements used for scan operations can be converted in normal operation to checkpoint storage. FIG. 7 illustrates one bit latch consisting of cross-coupled invertors 717 and 718. This bit latch may be written to via write bit lines 701, 702, 703 or 704. This is accomplished These write bit lines 701, 702, 703 or 704 are coupled to a write input node 713 via transfer gates formed of respective transistor pairs 705 and 706, 707 and 708, 709 and 710 and 711 and 712. One of these transfer gates is opened while the others are closed, permitting writing to the bit latch via one of the write bit lines 701, 702, 703 or 704. Inverter 726 drives a read node 727 which is coupled to read bits lines 736, 737, 738 and 739 via respective transfer gates consisting of transistor pairs 728 and 729, 730 and 731, 732 and 733 and 734 and 735. In FIG. 7 the shadow register latches composed of invertors 721 and 722 of a register file are normally used as part of scan path emulation. This includes scan data in 715, a transfer gate consisting of transistors 715 and 716, another transfer gate consisting of transistors 724 and 725 and scan data out 720. This structure can be used to perform a second task, namely, to store checkpoints to be used in recovery from a detected fault. In FIG. 7, the register file latch comprising invertors 717 and 718 can be viewed also as the master of a scan register flip flop which has invertors 721 and 722 forming its slave latch. Likewise the register file latch comprising invertors 717 and 718 can be viewed as the slave latch for the clocked master slave flip flops of register file 103. Thus the register file checkpoint need not require a large amount of additional circuits over those normally used.

DESCRIPTION OF SOFTWARE ASSISTED SOLUTION

The same components from FIG. 1 are present in the software assisted single event upset fault tolerant digital signal processor architecture. These components are modified because the checkpointed machine state could take on a constant value and the fault detection machine is simplified. The software assisted single event upset tolerant digital signal processor architecture has the possibility of higher performance than hardware intensive single event upset tolerant digital signal processor architecture.

The software assisted approach requires additional effort at program coding or compile-time over the hardware intensive approach. However, this is not inconsistent with the requirements for digital signal processing, for example, where typically software is compiled only once and used many times. Software for the software assisted approach will interact with the hardware in two ways not commonly found in other architectures. First, in the software assisted approach expected signatures imbedded in the software are compared against computed signatures. In cases of static code and data, the compiler will be able to determine the precise signatures. But in most cases, the compiler must introduce additional computations into the code stream to develop the signature "on the fly". It is desirable for these signature generation instructions to be introduced early in the code optimization process. A second method for determining signatures, forces in hardware the passing signature checkpoints to have a fixed value or a small set of fixed values. The problem for the compiler is then to assure that the run-time generated signature equals the fixed value or values. Second, in the software assisted approach, software should be able to force checkpoints at arbitrary times through a checkpoint instruction. This improves the performance of code that depends on write/read transactions with memory. There could be hardware savings if a side-effect of this selection of checkpoints is removing the need for many of the registers in the register file checkpoint 108. At a minimum, registers set aside by the compiler for expected signature generation can be cleared.

Figure 6:
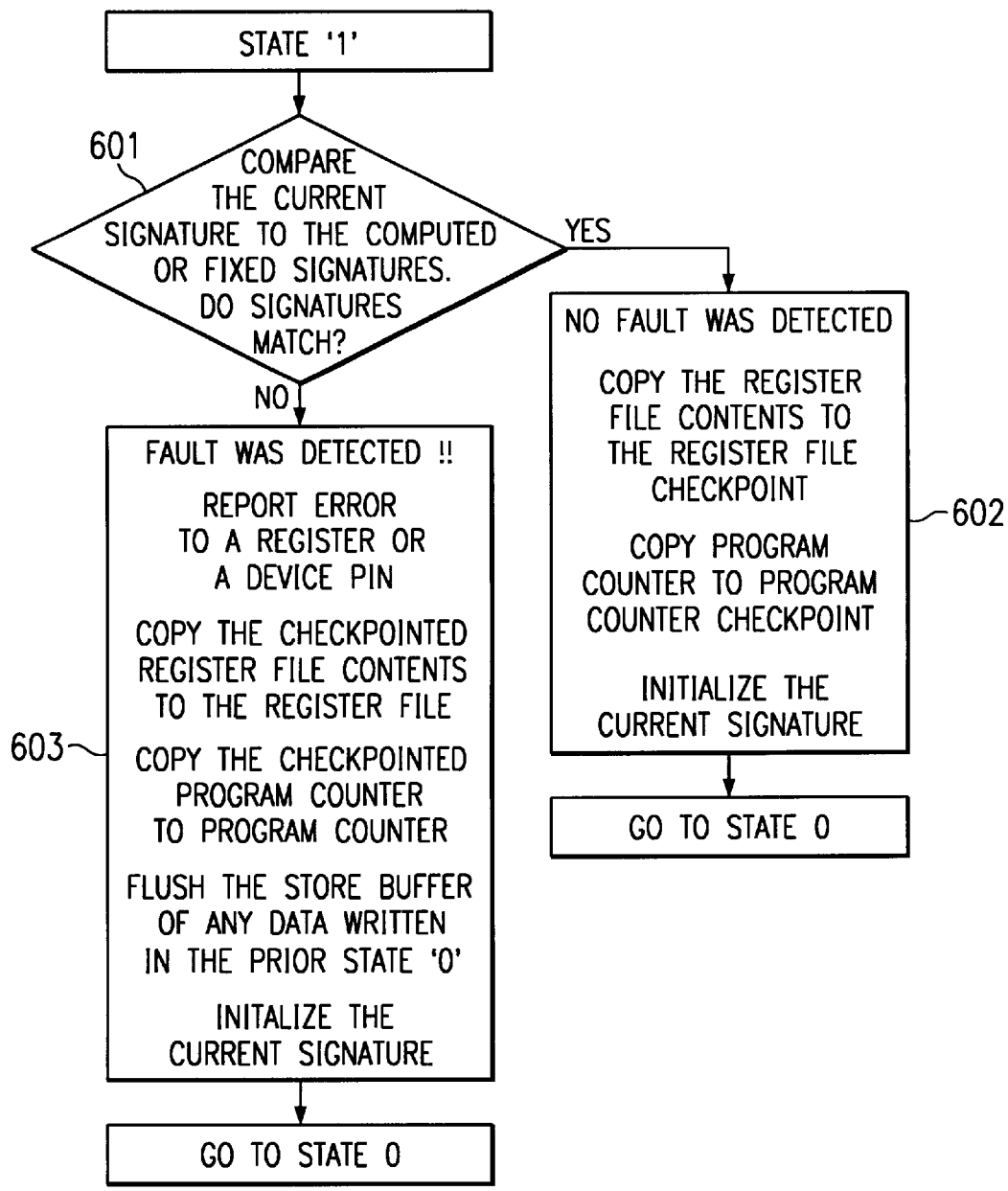
FIG. 6 illustrates in flow chart form the software assisted fault tolerant approach for state "1" through return to state "0" processes.

The pseudo-code for the fault detection machine is illustrated in the flow diagram of FIGS. 5, and 6, which describes the software assisted solution in detail. Referring now to FIG. 5, in state "0" the digital signal processor executes the instructions in a checkpointed block to form a signature to be used to detect an error. The checkpointed block is executed using the instruction execution hardware 101 and register file 103 and continues until an explicit checkpoint instruction is encountered (processing block 501). During this time a signature or multiple signatures are accumulated on computed results, and the process steps, store data and store addresses in the signature generation logic and registers 105, are accomplished. Any valid data in the store buffer from previous iterations of this algorithm are committed to memory concurrent with instruction execution of the checkpointed block. Store operations caused by instruction execution of the checkpointed block cause writes to store buffer 104 in locations vacated by committed data. Following this, the fault tolerant process proceeds to state "1".

Referring now to FIG. 6, the digital signal processor enters state "1" for fault detection, and following that, the machine state for the next state "0" step is initialized. After decoding a checkpoint instruction and advancing from state "0" to state "1", the current signature is compared to an expected signature (decision block 601). As noted above, this expected signature could be either a signature computed during instruction execution or one of a set of fixed signatures formed at compile time. If the current signature matches the expected signature, then no fault was detected. The digital signal processor is initialized to go to state "0" by saving the contents of register file 103 contents to the register file checkpoint 108, saving program counter 102 to program counter checkpoint register 107 and initializing the signature generation logic and registers 105 (processing block 602). Following these steps, the controlling state machine within the instruction execution hardware 101 returns to state "0". If the signature does not match the expected signature, then a fault was detected. The digital signal processor generates an externally visible report that a fault was detected (processing block 603). The state of the digital signal processor is initialized to return to "0" without any information from the prior instruction execution of the checkpoint block. This includes copying the checkpointed register file 108 over the register file 103, restoring program counter 102 from the program counter checkpoint 107, flushing store buffer 104 of any entries written in the prior state "0", which are invalid due to the detected fault, and initializing signature generation logic and registers 105 (processing block 603). In this way, state "0" will start with the same initial conditions as last evaluation of state "0". Following these steps, the controlling state machine begins state "0".

Note, that in the software assisted solution unlike in the hardware intensive architecture solution, store buffer 104 must be interleaved between system and instruction execution accesses. Also note that, in cases where the instructions for the expected signature generation instructions are few compared to the real code being executed, the software assisted solution approaches twice the performance of the hardware intensive solution.

Although the preferred embodiments of both the hardware intensive solution and the software assisted solution have been described in detail, it should be understood that various changes, substitutions and alterations can be made therein without departing from the spirit and scope of the invention as defined by the appended claims.

What is claimed is:

1. A fault tolerant data processor comprising:

an instruction execution hardware block performing instruction specified operations on data;

a register file connected to said instruction execution hardware for temporary storage of data;

a program counter storing a memory address of a next program instruction;

a data store buffer connected to said instruction execution hardware block for storing data and memory addresses of instruction specified writes to memory generated by said instruction execution hardware block;

a signature generation logic and registers circuit connected to said instruction execution hardware block for computing a signature from results of operations of said instruction execution hardware block on a block of instructions;

a signature checkpoint register for storing therein an expected signature; and a fault detection state machine connected to said signature generation logic and registers circuit and said checkpoint registers for
comparing a current signature generated by said signature generation logic and registers and said expected signature stored in said signature checkpoint register,
indicating valid operation if said current signature matches said expected signature, and
indicating a fault if said current signature does not match said expected signature.

2. The fault tolerant data processor of claim 1, further comprising:

a register file checkpoint connected to said register file operable to store data contents of said register file and to load previously stored data contents to said register file;

a program counter checkpoint connected to said program counter operable to store said memory address or to load a previously stored memory address to said program counter; and said fault detection state machine further operable to:
store said data contents of said register file into said register file checkpoint, store said memory address stored in said program counter into said program counter checkpoint, store data stored in said store buffer into external memory and continue execution of next block of instructions if valid operation is indicated,
reload said register file from data contents of said register file checkpoint, reload said program counter from said memory address stored in said program checkpoint, flush data stored in said store buffer and re-execute said block of instructions if a fault is indicated.

3. The fault tolerant data processor of claim 1, wherein:

said block of instructions consists of a predetermined number of instructions.

4. The fault tolerant data processor of claim 1, wherein:

said block of instructions consists of a number of instruction until said store buffer is full of data and addresses.

5. The fault tolerant data processor of claim 1, wherein:

said block of instructions consists of the first occurring of a predetermined number of instructions or a number of instructions until said store buffer is full of data and addresses.

6. The fault tolerant data processor of claim 1, wherein:

said block of instructions consists of a number of instructions until a checkpoint instruction.

7. The fault tolerant data processor of claim 1, wherein:

said expected signature consists of a signature generated by said signature generation logic and registers circuit during a prior execution of said block of instructions.

8. The fault tolerant data processor of claim 1, wherein:

said expected signature consists of a compiler determined signature embedded in said block of instructions.

9. The fault tolerant data processor of claim 1, wherein:

said expected signature consists of a computed signature computed by execution of a checkpoint block of instructions within said block of instructions.

10. The fault tolerant data processor of claim 1, wherein:

said register file includes a bit latch for each bit, at least one write bit line connected to each bit latch, at least one read bit line connected to each bit latch; and said fault tolerant data processor further comprising a scan path emulation circuit including for each bit latch of said register file:

a scan data in line, a first transfer gate connected between said scan data in line and said bit latch, a shadow bit latch, a second transfer gate connected between said bit latch and said shadow bit latch, and a scan data out line connected to said shadow bit latch, wherein, said shadow bit latch is a part of both said scan path emulation circuit and said register file checkpoint.

* * * * *